June 28, 1927.
L. J. CLAPP
VALVE MECHANISM
Filed March 18, 1921
1,633,772
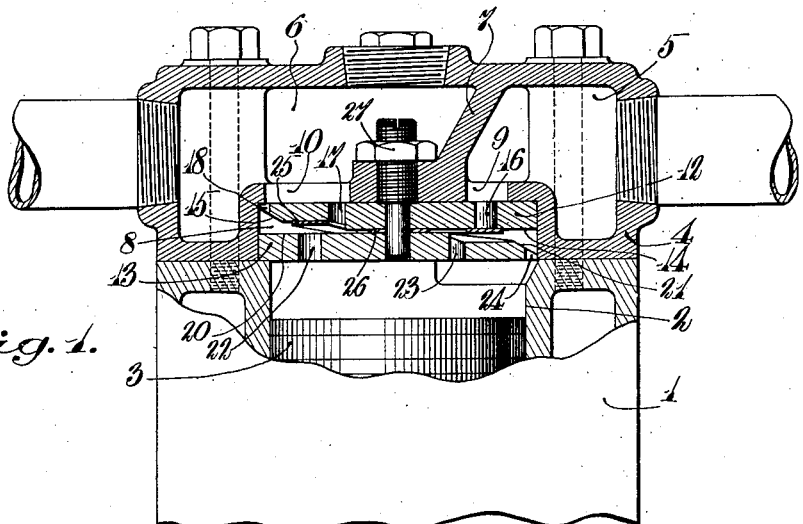
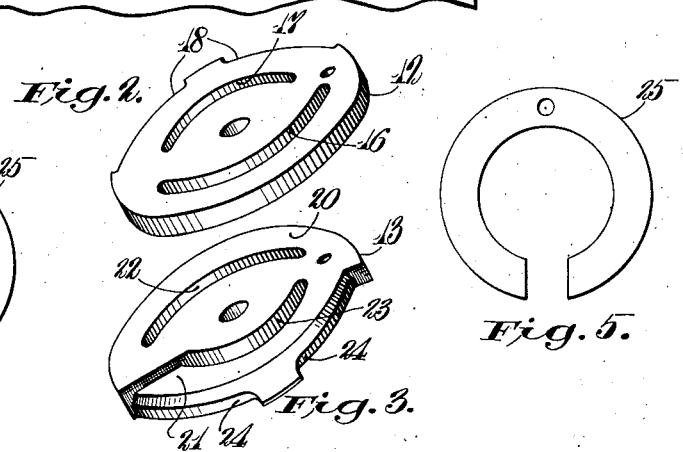
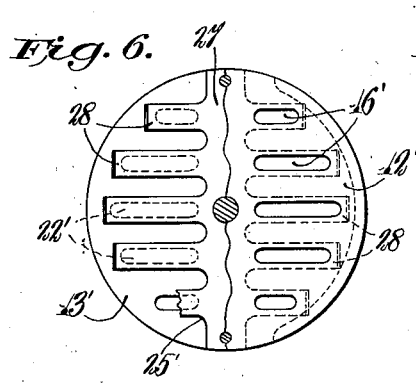
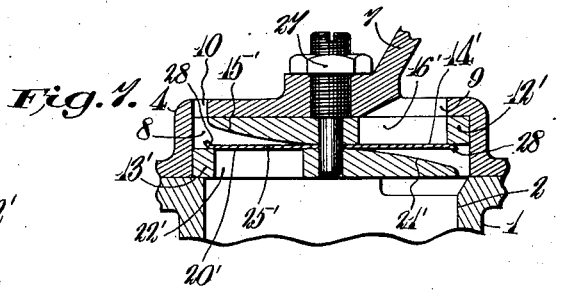
Inventor
Lewis J. Clapp
by
Atty.

Patented June 28, 1927.

1,633,772

UNITED STATES PATENT OFFICE.

LEWIS J. CLAPP, OF CLAREMONT, NEW HAMPSHIRE, ASSIGNOR TO SULLIVAN MACHINERY COMPANY, A CORPORATION OF MASSACHUSETTS.

VALVE MECHANISM.

Application filed March 18, 1921. Serial No. 453,512.

My invention relates to valve mechanisms and more particularly to flow controlled valve mechanisms for pumps or compressors.

An object of my invention is to provide an improved pump valve mechanism. Another object of my invention is to provide an improved valve mechanism for that type of pump used for the compression of fluids and in which a single valve may control a plurality of ports playing inlet and discharge functions. These and other objects of my invention will hereinafter more fully appear.

In the accompanying drawings I have shown for purposes of illustration two forms which my invention may assume in practice.

In these drawings,—

Fig. 1 is a central vertical section through the upper end of a compressor cylinder.

Figs. 2 and 3 are perspective views of the component members of the valve cage.

Figs. 4 and 5 are plan views of different forms of valve members which may be employed.

Fig. 6 is a view partially in plan and partially in section of a different form which my invention may assume in practice.

Fig. 7 is a central vertical section through the top end of a compressor cylinder provided with a valve mechanism of the type shown in Fig. 6.

For purposes of illustration I have shown my improved pump valve mechanism arranged for use with an air compressor, the latter having a cylinder member 1 which has a bore 2 in which a piston 3 is adapted to be reciprocated by any familiar means. The top end of the cylinder is covered by a head member 4 which is provided with intake and discharge chambers 5 and 6, respectively, these chambers being separated by a web 7 and opening by way of ports 9 and 10 into a valve cage receiving recess 8. Disposed within the recess 8 is a valve cage made up in the illustrative form of my invention of two valve cage members 12 and 13, these members being cylindrical in contour and plane on their remote faces. Their adjacent faces may be divided for purposes of description into opposite halves although the bounding line between the surfaces to be described does not come exactly at a median line of the cage members. The upper cage member 12 has a plane surface 14 parallel to its upper surface and is likewise provided with a surface cut away along an incline, herein in the form of a spiral incline 15 whereby a slot of increasing depth is formed. The valve cage member 12 is traversed by a port 16 opening through the plane surface 14 and by spaced ports 17 and 18 lying on opposite sides of (that is within and without) the inclined surfaces 15. The valve cage member 13 is similarly formed having a plane surface 20 and a spirally formed surface 21 whereby an oppositely disposed slot is provided, and this member is traversed by ports 22, opening through the plane surface 20, and 23 and 24 opening on opposite sides of the inclined or spiral surface. When the valve cage is assembled, a valve member 25 is secured between the cage members. The valve may be either of annular form as shown in Fig. 5 with a narrow portion cut away at one side, or may be of annular form with a central projecting tongue 26 of material lying between the free ends of the annular portion 25 as shown in Fig. 4. When the cage is assembled, the surfaces 15 and 20 are placed directly opposite each other and the surfaces 14 and 21 are likewise placed opposite each other. The valve is inserted between the two halves of the valve cage and the whole is then properly adjusted by any suitable means, in the present instance, by a bolt and nut construction 27. The valve normally closes both the ports 16 and 22, the opposite sides of the valve serving to play this function with the different ports.

It will be understood from the foregoing description, as the piston 3 moves downward in the cylinder bore 2, that a reduced pressure will result in the top of the cylinder and accordingly that atmospheric air from the chamber 5 passing through the ports 9 and 16 will unseat the valve 25 at one end thereof and passing through the ports 23 and 24 will fill the cylinder. Upon upward movement of the piston, the right hand side of the valve which has been open, will close the port 16 and upon building up of the pressure in the cylinder slightly above discharge pressure the opposite side of the valve 25 will be forced up, opening the port 22 and permitting discharge of air through the ports 17 and 18 to the discharge chamber 6. It will be readily apparent that the opening movement of the valve is limited by the inclined surfaces 15 and 21 and so that danger of breakage of the valve is minimized. These surfaces are preferably so formed that the valve on opening may roll back smoothly along them, whereby localization of strain and resultant fracture may be avoided.

In Figs. 6 and 7 I show another form which my improved valve mechanism may assume in practice. In this form, the valve cage members 12' and 13' located in the valve cage recess 8 are not of the same form precisely as previously described, for while each is provided with a plane valve seating surface (14' and 20' respectively) it will be noted that the inclined surfaces 15' and 21' are formed by cutting or grinding away substantially the whole of one-half of the adjacent surfaces of the cage members to varying degrees, the most material being cut away adjacent the edges remote from the diameter along which the valve member 25' is gripped. In this form of my invention, series of parallel valve slots or ports 16' and 22' are arranged on opposite sides of the line on which the valve is secured, and a valve 25' is provided with a central trunk portion 27 and with lateral branch portions 28, the latter covering the ports 16' and 22' and sealing them with their opposite sides. The mode of operation of this mechanism is identical in principle with that of the valve mechanism first described and accordingly will not need any detailed statement, it being noted that the valves here also tend to roll back smoothly, on opening, upon the surfaces 21' and 15'.

From the foregoing description it will be obvious that I have provided a simple valve mechanism comprising a minimum number of parts and in which a single valve by means of the opposite sides of opposite extremities thereof cooperates with inlet and discharge ports to control their opening, and so the functions of a pump or compressor.

While I have in this application specifically described two forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:—

1. In a pump valve mechanism, cage forming means having a pair of slots increasing in depth in opposite directions from the same point in said means and which terminate with their greatest depths substantially adjacent, said means having ports communicating with said slots, and valve means located in said slots controlling said ports.

2. In a pump valve mechanism, cage forming means having a pair of slots increasing in depth in opposite directions from the same point in said means and the ends of which would intersect a single plane if continued in their original path, said means having ports communicating with said slots, and valve means located in said slots for controlling said ports.

3. In a pump valve mechanism, cage forming means having a pair of slots having ends extending in one general direction from one side of said means and which increase in depth from said side, said means having ports communicating with said slots and surrounded by plane seats, and valve means cooperating with said seats and movable in said slots.

4. In a pump valve mechanism, cage forming means having a pair of slots having ends extending in one general direction from one side of said means and which increase in depth from said side, said means having ports communicating with said slots, and valve means having free ends disposed adjacent and having maximum movement in the deepest portions of said slots controlling said ports.

5. In a pump valve mechanism, a plurality of valve cage members each provided on its face opposed to the other with a surface to which the axis of said members is perpendicular and a generally spirally disposed surface sloping from said first mentioned surface, said spirally disposed surfaces being arranged diametrically opposite each other when said cage is assembled, ports traversing the first mentioned surfaces, and a valve disposed between said cage members and cooperating with said ports.

6. In a pump valve mechanism, a plurality of valve cage members each provided on its face opposed to the other with a surface to which the axis of said members is perpendicular and a generally spirally disposed surface sloping from said first mentioned surface, said spirally disposed surfaces being arranged diametrically opposite each other when said cage is assembled, ports traversing the first mentioned surfaces, and a flexible valve disposed between said cage members and cooperating with the opposite ends thereof with said ports.

7. In a pump valve mechanism, a plurality of valve cage members each provided on its face opposed to the other with a surface to which the axis of said members is perpendicular and a generally spirally disposed surface sloping from said first mentioned surface, said spirally disposed surfaces being arranged diametrically opposite each other when said cage is assembled, ports traversing the first mentioned surfaces, and a flexible valve clamped between said cage members along a line disposed between said unlike surfaces and cooperating with said ports.

8. In a pump valve mechanism, a plurality of cage members having parallel surfaces disposed on opposite sides of a central line thereof and separated by the thickness of a valve, arcuate inclined surfaces in each of said cage members disposed opposite the first mentioned surfaces of the other, ports traversing the first mentioned surfaces, and a valve disposed between said cage members and adapted to bend about said central line.

9. In a pump valve mechanism, a valve cage provided with slots on opposite sides thereof, one of the bounding surfaces of one of said slots being parallel to one of the bounding surfaces of the other, a valve seating on said surfaces, arcuate ports traversing said surfaces, said valve when open being limited as to its movement by the other surfaces of said slots.

10. In a pump valve mechanism, a valve cage comprising members having parallel opposed valve seating surfaces and spirally inclined guard surfaces, said seating surfaces being traversed by arcuate ports, and a single valve controlling said ports with its opposite surfaces.

11. In a pump valve mechanism, a valve cage comprising members having parallel opposed valve seating surfaces, said surfaces being traversed by ports, and a single normally plane spirally flexing valve controlling said ports with its opposite surfaces.

12. In a pump valve mechanism, a valve cage through which fluid may pass in opposite directions, said cage being traversed by a plurality of arcuate ports and having valve seat and guard areas adjacent said ports, one of said areas being spirally inclined, and a single valve controlling said ports with its opposite plane surfaces.

13. In a pump valve mechanism, a valve cage traversed by a plurality of arcuate ports and having valve seat areas surrounding said ports, and substantially ring shaped valve means having free ends controlling said ports and movable in opposite directions in uncovering the same.

14. In a pump valve mechanism, a valve cage traversed by a plurality of arcuate ports and having valve seat areas surrounding said ports and a single substantially ring shaped valve means having free ends controlling said ports with the ends thereof, said ends moving in opposite directions relative to their normal positions, in opening said ports.

15. In a pump valve mechanism, a valve cage traversed by a plurality of oppositely disposed arcuate ports and having valve seat areas surrounding said ports, valve means adapted to be subjected to a spiralling action and to cooperate with said seat areas, and surfaces on said cage for controlling the degree of opening of said valve means and subjecting the latter to a spiralling action.

16. In a valve mechanism, a valve cage traversed by a plurality of ports and having valve seat areas surrounding said ports, and a single valve approximately annular in contour and open at one side controlling said ports with its opposite surfaces.

17. In a valve mechanism, a valve cage comprising two substantially annular plates, arcuate spirally inclined surfaces formed in said plates, ports in said plates opposite said surfaces, and a valve interposed between said plates and adapted to control said ports.

18. In a valve mechanism, a valve cage comprising substantially annular plates, spirally inclined slots in said plates, and a valve interposed between said plates in said slots.

19. In a valve mechanism, a cage, spirally inclined slots in said cage, ports communicating with said slots, and a valve disposed in said slots adapted to control said ports.

20. In a valve mechanism, a valve cage comprising a pair of plates, spirally inclined slots in said plates having ports communicating therewith, and a valve interposed between said plates and having portions projecting in said slots adapted to control said ports.

21. In a valve mechanism, a cage, ported inclined slots in said cage, and a valve disposed in said cage substantially ring shaped and open at one side and adapted to control said ports with its portions adjacent said opening.

22. In a valve mechanism, a cage having ported slots therein through which fluid may pass in opposite directions and a valve disposed in said cage centrally held at one side thereof and having free ends movable on opening movement in mutually opposite directions, according to the direction taken by the fluid in passing through the cage.

23. In a valve mechanism, a cage having a spiral surface formed therein, a ported opening therein, and a substantially annularly shaped valve disposed in said opening and held at one side thereof, said valve having a spirally flexing free outer portion adapted to control said port and movable into contact with said spiral surface.

24. In a valve mechanism, a cage, a ported opening therein, a substantially annularly shaped valve disposed in said opening and held at one side thereof, said valve having a spirally flexing free outer portion adapted to control the port means in said opening, and means whereby gradual increase in flexure thereof gradually increases the resistance to flexure.

25. An article of manufacture comprising a valve member having a substantially ring shaped portion with free outer ends, and means whereby the same may be held at one side thereof by suitable oppositely disposed cooperating valve cage elements of identical structure.

26. An article of manufacture comprising a valve having a substantially ring shaped portion with free ends, and a spacing member projecting from the side of said ring opposite the free ends and outwardly between said free ends.

27. An article of manufacture comprising a valve cage member having parallel flat surfaces, a port traversing one of said surfaces while the other surface thereof is cut away to form an inclined spiral recess.

28. An article of manufacture comprising a valve cage member having parallel flat surfaces, a port traversing one of said surfaces while the other surface thereof is cut away to form an inclined spiral recess, and a port adjacent the inner side of said spiral recess.

29. A combined valve support and cylinder head adapted to seat on a cylinder and having a plurality of chambers, means forming a recess therein, which is in direct communication with both of said chambers, and a valve cage disposed in said recess and whose lower surface lies in the same plane as the end of the cylinder.

30. The combination with a cylinder having a bore, of a combined inlet and exhaust valve seated on the end of said cylinder and over said bore, and a plural-chambered member cooperating with said cylinder and valve adapted to position the latter and to allow flow of fluid through each of said chambers directly through said valve.

31. The combination comprising a cylinder, a valve mechanism, and a common means disposed centrally of said cylinder and adapted to position said mechanism from lateral displacement relative to said cylinder while said means also maintains the elements of said mechanism in operative assembled relation.

32. The combination comprising a cylinder, a plural-part valve mechanism, and means including a pin directly removable from said mechanism without dismounting the latter from said cylinder relative to said parts and cooperating with said mechanism to hold said parts in operative assembled relation.

33. In a pump valve mechanism, a cage having spirally inclined valve engaging surfaces, and inlet and discharge ports traversing said surfaces, and a single valve having a fixed central portion and free end portions cooperating with said ports.

34. In a valve mechanism, a cage, slots therein traversed by inlet and discharge ports, and a valve disposed in said slots centrally held and having spirally flexing ends adapted to control said ports.

35. In a valve mechanism, a valve cage comprising cooperating generally circular plates, spirally inclined slots formed in said plates, inlet and discharge ports traversing said slots, and a valve controlling said ports interposed between said plates in said slots.

36. In a valve mechanism, a valve cage comprising cooperating members having spirally inclined opposed valve engaging surfaces, said surfaces being traversed by arcuate inlet and discharge ports, and a single valve controlling said ports with its opposite surfaces.

37. In a valve mechanism, a valve cage traversed by a plurality of arcuate inlet and discharge ports and having spirally inclined valve engaging areas surrounding said ports, and a single valve controlling said ports with its opposite surfaces.

38. In a valve mechanism, a cage comprising a pair of slots increasing in depth in opposite directions from the same point in said cage, annular valve means located in said slots, and means forming inlet and discharge ports communicating with said slots and controlled by said valve means.

39. In a valve mechanism, a ported arcuate valve seat, an arcuate valve having a free end and cooperating with said seat, a guard element having an arcuate stop surface, said guard element being disposed at the opposite side of said valve from said seat, and means for holding said parts in assembled relation with said guard element engaging said valve, the arcuate stop surface of said guard element departing progressively from said valve, from the point of contact between said element and said valve to a point adjacent the free end of said valve, in a smooth curve without shoulders, whereby said valve may flex into contact with the stop surface smoothly and without sharply localized stress.

40. In a valve mechanism, a cage having ports formed therein, said ports being adapted to pass fluid in opposite directions through said cage, and a single valve having a substantially ring-shaped portion held only at one side thereof and flexible end portions controlling said ports.

41. The combination with a cylinder having a bore, a valve cage adapted to seat directly upon the end of said cylinder and disposed over said bore, and a member secured to said cylinder having an adjustable element projecting therefrom adapted to engage said cage to position the latter relative to said cylinder.

42. The combination with a cylinder having a bore, a valve cage adapted to seat directly upon the end of said cylinder and disposed over said bore, and a member secured to said cylinder forming a head therefor having a bolt projecting therefrom adapted to engage said cage to position the latter relative to said cylinder.

43. The combination with a cylinder having a bore, a valve cage adapted to seat directly upon the end of said cylinder and disposed over and closing said bore, said cage carrying valve means for controlling fluid flow from said bore, and a member secured to said cylinder forming a head therefor having a bolt projecting therefrom adapted to engage said cage to position the latter relative to said cylinder.

In testimony whereof I affix my signature.

LEWIS J. CLAPP.